Figure 1:
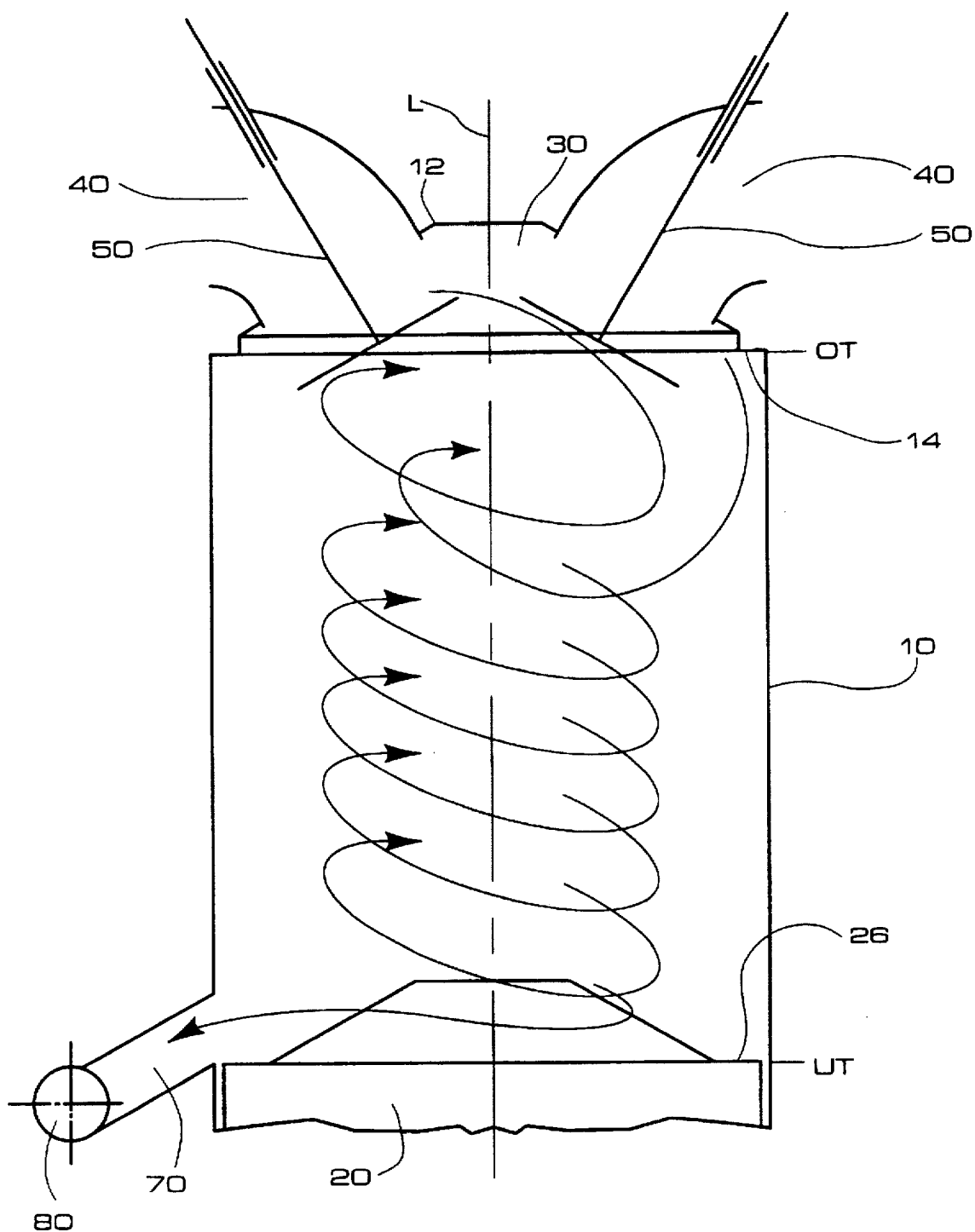

United States Patent
König

[11] Patent Number: 5,738,050
[45] Date of Patent: Apr. 14, 1998

[54] CONTROLLED TWO-STROKE INTERNAL COMBUSTION ENGINE

[76] Inventor: Kurt König, Am kappengrund 32, 86946 Vilgertschofen-Issing, Germany

[21] Appl. No.: 652,583

[22] PCT Filed: Dec. 6, 1994

[86] PCT No.: PCT/EP94/04061

§ 371 Date: Oct. 23, 1996

§ 102(e) Date: Oct. 23, 1996

[87] PCT Pub. No.: WO95/16113

PCT Pub. Date: Jun. 15, 1995

[30] Foreign Application Priority Data

Dec. 8, 1993 [DE] Germany .................. 43 41 885.6

[51] Int. Cl.$^6$ ........................................... F02B 75/02
[52] U.S. Cl. ............................................ 123/65 VD
[58] Field of Search ................ 123/65 VB, 65 WA, 123/65 R, 65 P, 568

[56] References Cited

U.S. PATENT DOCUMENTS

| | | | |
|---|---|---|---|
| 1,731,228 | 10/1929 | Burtnett | 123/65 VB |
| 1,833,802 | 11/1931 | Violet | 123/65 VB |
| 1,878,339 | 9/1932 | Southern | 123/65 VB |
| 2,030,732 | 2/1936 | Angel | 123/65 VB |
| 2,096,327 | 10/1937 | Howard | 123/65 WA |
| 2,189,106 | 2/1940 | Garve et al. | 123/65 VB |
| 2,466,181 | 4/1949 | Myrick | 123/65 VB |
| 4,567,863 | 2/1986 | Fletcher | 123/307 |
| 4,693,215 | 9/1987 | Sugiyama et al. | 123/308 |
| 4,864,979 | 9/1989 | Eickmann | 123/65 VB |
| 4,995,349 | 2/1991 | Tuckey | 123/65 WA |
| 5,027,757 | 7/1991 | Pusic | 123/65 VB |
| 5,365,902 | 11/1994 | Hsu | 123/304 |

FOREIGN PATENT DOCUMENTS

| | | | |
|---|---|---|---|
| 0554235 | 1/1993 | European Pat. Off. | |
| 2346887 | 4/1975 | Germany | 123/65 VB |
| 3600408 | 7/1987 | Germany | 123/65 VB |
| WO86/06789 | 11/1986 | WIPO. | |
| WO91/00684 | 1/1991 | WIPO. | |

*Primary Examiner*—David A. Okonsky
*Attorney, Agent, or Firm*—Mallinckrodt & Mallinckrodt

[57] ABSTRACT

The invention concerns a two-stroke internal combustion engine and a method of operating a two-stroke internal combustion engine which includes at least one cylinder (10) with a piston (20) reciprocating therein and with at least one inlet (40) and exhaust duct (70), wherein the inlet duct (40) is arranged in relation to the exhaust duct (70) in accordance with the uniflow scavenging process in such a way that the inlet duct (40) opens into the cylinder in the region of the combustion chamber (30) and wherein a regulating element (50) is provided in the mouth opening region of the inlet duct (40). In that arrangement the regulating element (50) of the inlet duct (40) can be adapted to be controllable and a controllable regulating element (80) can also be arranged in particular in the mouth opening region of the exhaust duct (70). As a result the internal combustion engine can be operated in such a way that the exhaust duct (70) can be closed in dependence on an operating parameter of the internal combustion engine.

20 Claims, 6 Drawing Sheets

CONTROLLED TWO-STROKE INTERNAL COMBUSTION ENGINE

DESCRIPTION

The invention concerns a two-stroke internal combustion engine as set forth in the classifying portion of claim 1 and a method of operating a two-stroke internal combustion engine as set forth in the classifying portion of claim 13.

German patent specification No 583 885 discloses a two-stroke internal combustion engine and a method of operating same, in which both an inlet duct for air and also an inlet duct for a fuel-air mixture open into a combustion chamber of a cylinder. An exhaust duct for the exhaust gases opens at the cylinder wall in such a way that this known two-stroke internal combustion engine can be scavenged by means of unidirectional or uniflow scavenging. Opening and closing both of the inlet duct for the scavenging or fresh air and also the inlet duct for the fuel-air mixture is effected by way of non-controllable valves whereas the exhaust duct is opened or closed by way of the reciprocating piston. Opening of the valves is effected by virtue of the spring force of the respective valve spring being overcome by means of the medium which is introduced into the combustion chamber. An asymmetrical control diagram can be obtained with that known two-stroke internal combustion engine for the feed of the fresh mixture by virtue of control, which is not described in greater detail, in respect of the blower for the fresh air and the dimensioning of the valves. In contrast, it is only possible to provide a symmetrical control diagram for discharge of the exhaust gases, which results in an increased fuel consumption and a comparatively high level of pollutant emission.

German patent specification No 410 695 also disclosed a two-stroke internal combustion engine wherein a pressure oil-operated slider is disposed in an inlet duct for scavenging air. German patent specification No 410 695 does not disclose whether and in what way the slider is controlled. The exhaust duct is also arranged in relation to the inlet duct in such a way that this known two-stroke internal combustion engine can be scavenged by means of uniflow scavenging. Opening and closure of the exhaust duct are effected by way of the reciprocating piston. It is also to be noted that this known two-stroke internal combustion engine is operated by means of Diesel fuel, for which purpose an injection nozzle arranged within the rotary slider injects Diesel fuel into the combustion chamber at a given time.

Finally DE 40 12 474 A1 discloses a two-stroke internal combustion engine in which both the inlet duct and also the exhaust duct can be opened and closed with a respective valve. In that case scavenging is effected by means of the cross-flow scavenging method which has the disadvantage in relation to the uniflow scavenging method that exhaust gases can remain in the cylinder, in spite of the supply of scavenging air of fresh mixture. As in addition the exhaust duct opens into the cylinder in the region of the combustion chamber, thermal problems occur in that respect.

The object of the present invention is to provide a two-stroke internal combustion engine and a method of operating a two-stroke internal combustion engine of the kind set forth in the opening part of this specification, which, with a higher degree of efficiency, permits a reduced fuel consumption and a lower level of pollution emission.

In a two-stroke internal combustion the foregoing object is attained in that the regulating element of the inlet duct is adapted to be controllable and that a regulating element which is also controllable is arranged in the mouth opening region of the exhaust duct. In this respect controllable regulating element means that the moment of opening or closing, the opening or closing time and/or the opening or closing speed can be controlled in dependence on one or more operating parameters of the internal combustion engine, in particular the rotary angular position of the crankshaft. The proposed construction makes it possible that an asymmetrical control diagram can be provided both for the inlet range and also the exhaust range, which in turn permits a particularly advantageous fuel consumption and a reduction in the level of pollution emission.

At the same time use of the uniflow scavenging method provides for particularly fast and thorough cleaning of the combustion chamber or cylinder, in respect of the exhaust gases. In addition the outlet which can be opened and closed by the controllable regulating element affords a possibility for the engine designer freely to determine the position of the exhaust duct in the cylinder wall. Thus in that way for example the exhaust duct can be moved closer to the combustion chamber so that it is possible to achieve a higher discharge flow speed for the exhaust gases and to empty the combustion chamber or cylinder of the exhaust gases more quickly. At the same time or as an alternative thereto, the outlet can be opened earlier by the controllable regulating element, in comparison with an uncontrolled outlet, so that the exhaust gases are overall cooler, thereby possibly avoiding a thermal problem which may arise. It is also to be noted that the drive for the controllable regulating elements can be produced for example by way of one or more camshafts. If those camshafts are electrohydraulically adjustable, not only is it then possible to achieve an asymmetrical control diagram, but it is also possible to provide for displacement of the entire opening time both of the inlet and also the outlet valves. The valves themselves used may be the most widely varying elements such as for example poppet or mushroom-type valves with valve elements opening into the cylinder, rotary slide or disk valves or the like. It is also to be noted that the controllable regulating element in the exhaust duct does not have to be arranged directly into the mouth opening region of the exhaust duct into the cylinder chamber, but can be disposed at a certain spacing relative thereto. In that way it is possible to avoid thermal problems for the exhaust valve, which may possibly occur, so that the amount of material used for the exhaust valve is reduced. With suitable tuning of the engine there is then the possibility of producing an additional charging effect in the feed of the fresh mixture as after closure of the exhaust duct by means of the controllable regulating element, the fresh mixture penetrates into the exhaust duct and is thrown by the closed controllable regulating element back into the combustion chamber where further fresh mixture has already accumulated. It is finally also to be noted that it is also possible only to provide one controlled regulating element for the exhaust duct and one uncontrolled regulating element for the inlet duct. If a plurality of inlet ducts are provided in that case, there is the possibility of arranging an uncontrolled or a controlled regulating element in the individual inlet ducts, for example depending on the function of the respective inlet duct.

If the inlet duct is so arranged that it opens tangentially into the combustion chamber of the cylinder, the fresh air or the fresh mixture passes into the combustion chamber in a circling movement along the wall of the cylinder. As the cylinder wall is cooled by a suitable cooling arrangement, the fresh gases are accordingly also cooled down so that filling of the combustion chamber is improved and the compression ratio can be increased without the risk of self-ignition, which at the same time means a higher power output and a saving on fuel.

One and also two or more inlet ducts may open into the combustion chamber. If there are two inlet ducts, it is particularly advantageous if they are arranged on both sides or symmetrically relative to the longitudinal axis of the cylinder so that when the two-stroke internal combustion engine is used as a gasoline-burning internal combustion engine, the sparking plug can be arranged on the longitudinal axis of the cylinder, that is to say in the middle of the cylinder. In that respect the central arrangement of the sparking plug is advantageous as the flame front can be uniformly propagated. If the two-stroke internal combustion engine is provided as a Diesel-burning internal combustion engine, an injection nozzle can be provided in place of the sparking plug, whereby the same advantages are achieved as in the case of a gasoline-burning two-stroke internal combustion engine, in particular combustion taking place uniformly.

In addition the combustion chamber and the piston may each have a for example annular squish or squeeze surface, which surfaces are of such a configuration that there is an annular squish or squeeze gap along the cylinder wall in the top dead center position, whereby the fresh mixture is conveyed at high speed and possibly with a circling movement into the combustion chamber, in particular into the center of the combustion chamber. That provides a high compression effect without self-ignition of the fuel-air mixture occurring. If the sparking plug is arranged centrally combustion in that arrangement can take place uniformly in all directions.

A further improvement in the efficiency of the two-stroke internal combustion engine can be achieved by the piston being provided at its upper piston surface with a mixture guide element, preferably a raised portion or dome. Upon being compressed the fresh mixture is accelerated by the mixture guide element in the direction of the center of the correspondingly shaped combustion chamber, and there concentrated. If in its center the mixture guide element has a part-spherical or the like shaped recess which can form a part of the combustion chamber, the mixture or the fresh air can be arranged in highly concentrated manner in front of a sparking plug or an injection nozzle.

The above-indicated object is attained in terms of the method in that the exhaust duct is opened or closed in dependence on an operating parameter of the internal combustion engine, in particular the rotary angular position of the crankshaft. In this case also one again it is possible to achieve an asymmetrical control diagram for the exhaust region. In this case the inlet duct may also have a controllable regulating element. Besides the operating parameter 'speed of rotation' already used in the case of four-stroke internal combustion engines, it is also possible to use other operating parameters as control values.

If at least two inlet ducts or more are provided for the two-stroke internal combustion engine, then an injection valve can be arranged in each inlet duct. In that way it is possible to achieve a so-called layered charge in the combustion chamber, that is to say, the two-stroke internal combustion engine can be operated in such a way that, fore each working stroke, firstly a lean mixture passes into the combustion chamber, in particular just before reaching the bottom dead center position, and then a rich mixture passes into the combustion chamber. A mode of operation of that kind which is referred to in the technical literature as lean-burn engines results in a high saving in terms of fuel. In this case also the fresh air or the fresh mixture can be introduced into the cylinder with a circling motion.

If the fresh mixture is accelerated by means of the piston which is moving from the bottom dead center position to the top dead center position, in particular just before reaching the top dead center position, that makes it possible to achieve a high compression effect, without in that case the temperature of the fresh mixture initially rising greatly, that is to say, it rises with a time delay. That in turn results in an increase in the power output of the two-stroke internal combustion engine.

If the two-stroke internal combustion engine is operated for example as a Diesel fuel-burning internal combustion engine, it is advantageous if the fresh air in the cylinder chamber is accumulated in the center of the combustion chamber, by means of the piston as it moves from the bottom dead center position to the top dead center position. That permits particularly gently combustion as the Diesel fuel accumulates inter alia in the form of a thin film on the wall of the recess.

So that the amount of fresh gas or fresh air which is caused to pass into the cylinder for operation of the internal combustion engine is only as much as is required for the respective load range (idle, part load, etc), it can be provided that the amount of fresh gas required is regulated by way of a variable scavenging pressure which is set in dependence on the load applied to the internal combustion engine. That can be achieved for example by virtue of the provision in the fresh gas duct of a sensor for detecting pressure, which sensor is arranged upstream of the controllable regulating element and is connected to an electronic regulating system or control system for the internal combustion engine. In addition, it is also possible to dispose upstream of the controllable regulating element in the fresh gas duct a pressure relief valve which is controlled by the electronic control system. In dependence on the load applied to the internal combustion engine or the load transported thereby, the pressure relief valve is opened or closed by the electronic regulating system. In that way it is possible to provide for quantitative control and regulation of the amount of fresh gas supplied. That quantitative control can also be effected by the provision in the exhaust duct of a drivable throttle flap or valve which is arranged downstream of the controllable regulating element. That throttle flap is also actuated in dependence on load by a control motor or other drive, while in this case also there is provided and electronic control system which converts the load-dependent data into drive values for the drive of the throttle flap. This ensures that only as much exhaust gases pass into the open air, as fresh gases are required.

In both cases exhaust gas residues remain in the cylinder, whereby exhaust gas recycling is eliminated and thus the combustion procedure is cooler, which reduces the emission of pollution. It is also to be pointed out that the above-described possibilities may also be combined with each other.

It is also to be noted that, besides Diesel and gasoline, other gaseous fuels may also by used for the invention.

Figure 2A:
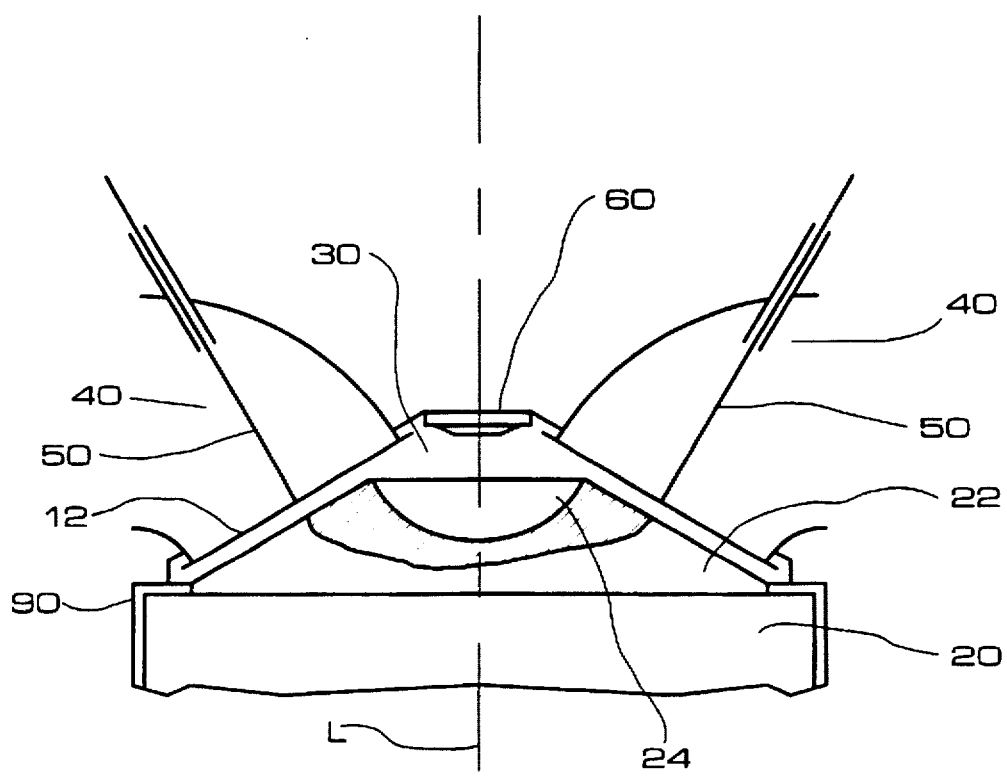
Figure 2B:
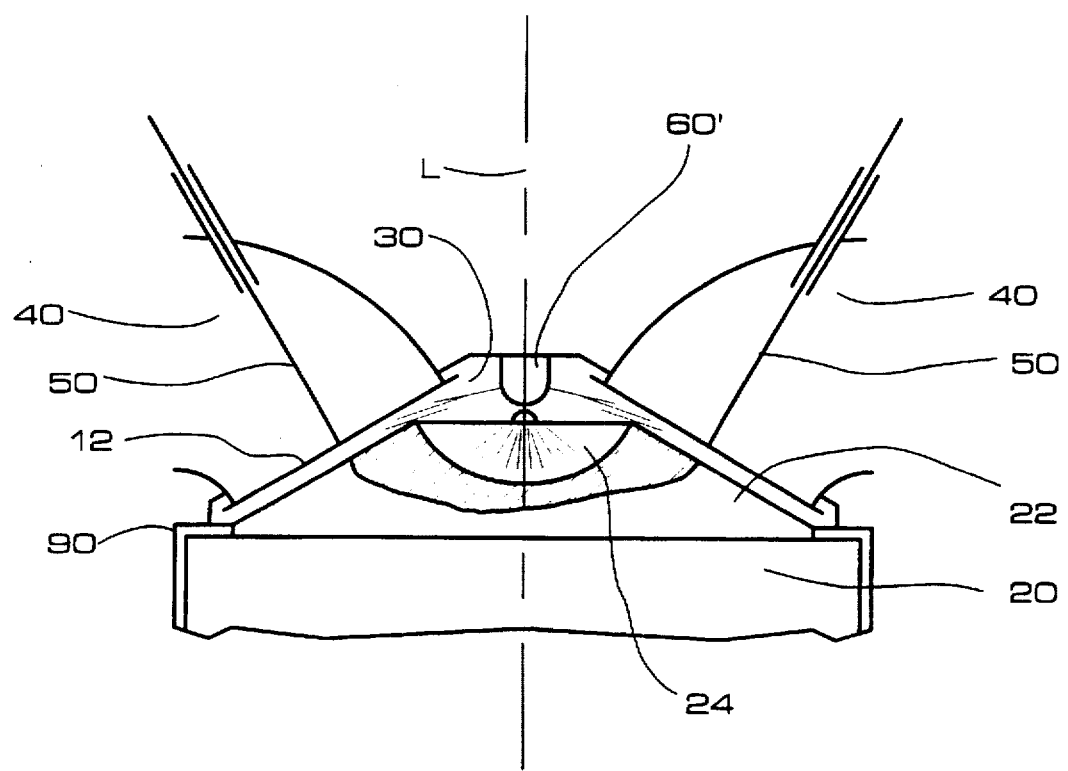
Figure 3:
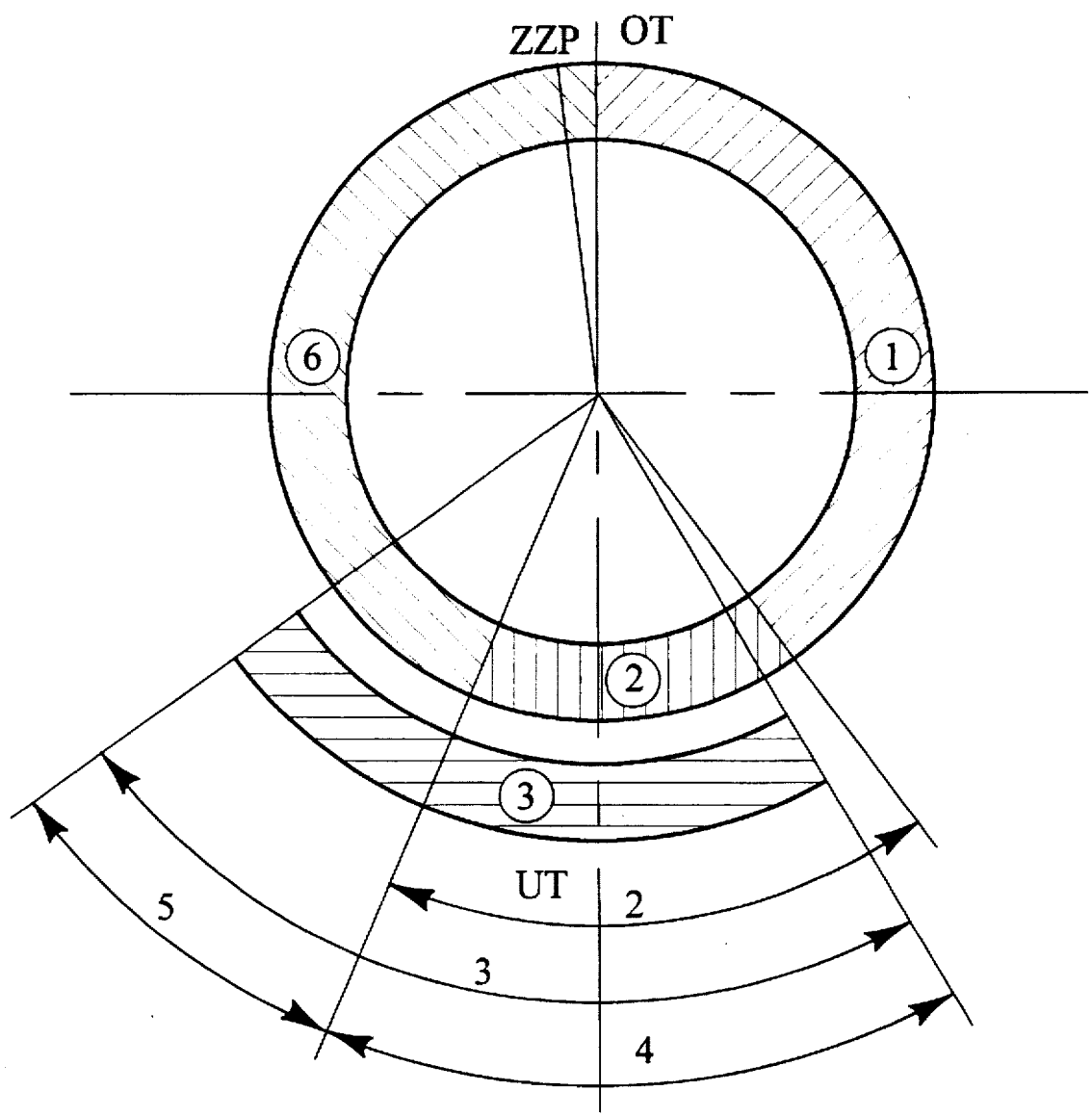
Figure 4:
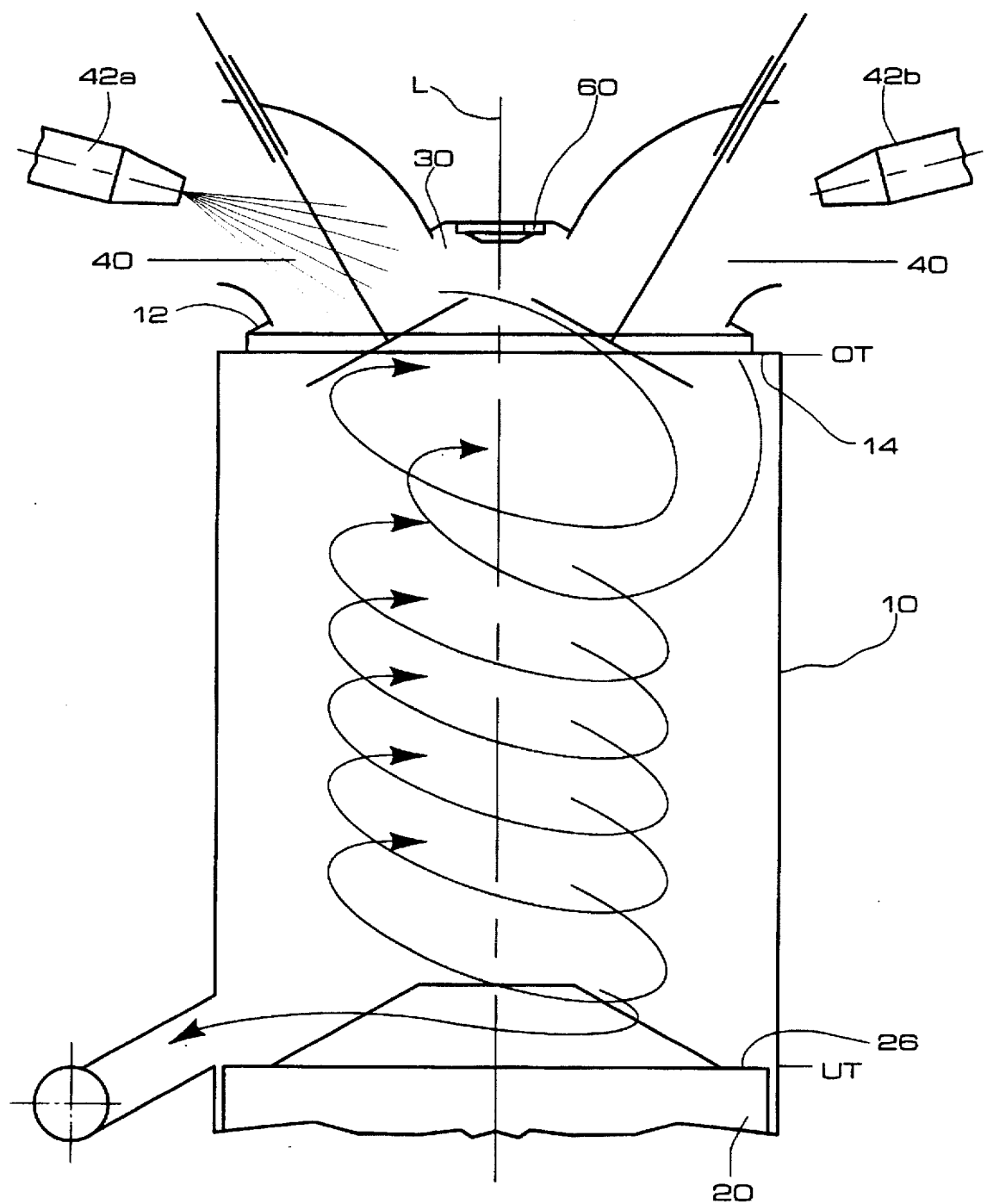
Figure 5:
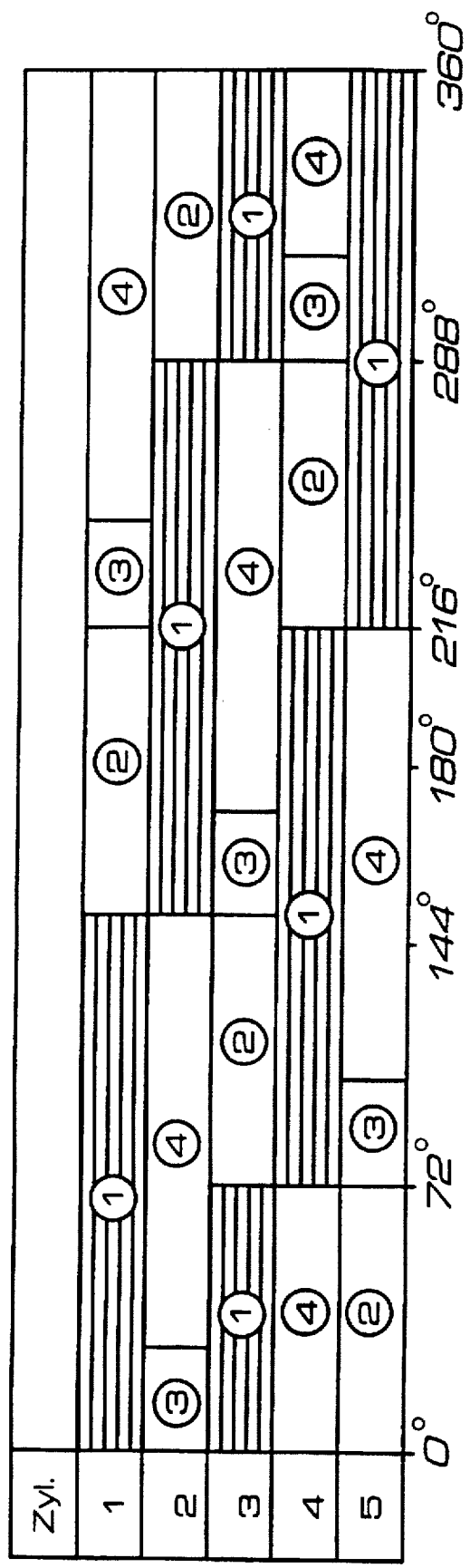

Advantageous configurations and embodiments are described hereinafter with reference to the drawings in which:

FIG. 1 is a diagrammatic view in longitudinal section through a cylinder of an internal combustion engine according to the invention, FIGS. 2a and 2b are diagrammatic partial views in longitudinal section through the combustion chamber of FIG. 1, FIG. 3 shows a control diagram for the internal combustion engine according to the invention, FIG. 4 shows a further embodiment of the internal combustion engine according to the invention, and FIG. 5 shows a working diagram for a five-cylinder two-stroke in-line engine.

In FIG. 1, reference numeral 10 denotes a cylinder and reference numeral 20 denotes a piston which can reciprocate from a bottom dead center position (=UT) to a top dead center position (=OT). Two inlet ducts 40 open on both sides of a longitudinal axis L of the cylinder 10 into the combustion chamber 30 of the cylinder head 12, the combustion chamber being of a frustoconical configuration. In this case the inlet ducts 40 are so arranged that the fresh mixture issuing therefrom can pass into the cylinder 10 with a circling motion along the wall of the cylinder, as is illustrated by appropriate arrows in FIG. 1. The two inlet ducts 40 can be opened and closed by means of inlet valves 50. In this case the two inlet valves 50 are so designed that upon opening of the respective inlet duct 40 they project into the combustion chamber 30, as illustrated in FIG. 1. The two valves 50 can be pre-loaded into their closed position by means of a spring (not shown). As can be seen from FIG. 2a, a sparking plug 60 can be arranged in the center of the frustoconical combustion chamber 30 in such a way that it sits on the longitudinal axis L of the cylinder 10. Alternatively, instead of the sparking plug 60, there may be provided an injection nozzle 60', in particular a multi-hole nozzle, as can be seen from FIG. 2b. Referring to FIG. 1, disposed beneath the inlet ducts 40 is the exhaust duct 70 which can be opened and closed by way of a controllable regulating element, such as for example a valve 80. As can be seen from FIG. 1 the exhaust valve 80 is arranged at a certain spacing relative to the mouth opening region of the exhaust duct 70 into the cylinder 10. That makes it possible to avoid thermal overloading of the exhaust valve 80. As can also be seen from FIG. 1 the exhaust duct 70 is arranged relative to the two inlet ducts 40 in such a way that scavenging of the cylinder 10 is effected by means of uniflow scavenging. Both the exhaust valve 80 and also the two inlet valves 50 are respectively controllable in dependence on an operating parameter of the internal combustion engine.

As can be seen from FIGS. 2a and 2b the piston 20 is provided with a frustoconical raised portion or dome 22 which forms a mixture or fresh air guide element and the shape of which is substantially adapted to the frustoconical shape of the combustion chamber 30. Provided in the center of the frustoconical raised portion 22 is preferable part-spherical recess 24 in which the fresh air or the mixture to be fired can be collected, opposite the sparking plug 60 or the injection nozzle 60'. In addition, as can also be seen from FIGS. 2a and 2b, formed between an annular surface 26 of the piston 20 and the cylinder head surface 14 which is opposite the piston 20 when it reaches the top dead center position is a squeeze gap 90 which displaces the fresh air or the mixture which has accumulated at that location during the compression procedure, and accelerates it through the frustoconical raised portion 22 of the piston 20 in the direction of the sparking plug 60 or the injection nozzle 60'.

As the two inlet ducts 40 and the exhaust duct 70 are controlled by way of controllable regulating elements 50, 80 in dependence on an operating parameter of the internal combustion engine, it is possible to produce an asymmetrical control diagram, as can be seen from FIG. 3. In FIG. 3, 1 represents the working stroke of the piston, 2 represents the discharge flow of burnt gases, 3 represents the intake flow of fresh gases, 4 represents scavenging, 5 represents additional charging, and 6 represents the compression stroke of the piston.

As can be seen from FIG. 4, the fresh mixture can also be produced by means of injection of fuel into the fresh air which is supplied through the inlet ducts 40 by means of a blower (not shown). For that purpose, an injection valve 42a and 42b respectively is disposed in each of the inlet ducts 40. Instead of two inlet ducts 40 each having an injection valve 42a and 42b respectively, it is also possible to provide a single injection inlet duct 40 having a step injection nozzle (not shown). It is also possible to provide two injection valves 42a and 42b respectively in one inlet duct 40.

The mode of operation of the internal combustion engine according to the invention is described hereinafter:

In the first stroke the piston 20 is working, that is to say it moves from the top dead center position to the bottom dead center position. Before it reaches the bottom dead center position, the exhaust duct 70 is opened on the one hand by the piston 20 but also by the controllable regulating element 80. Shortly thereafter the inlet ducts 40 are opened by the two valves 50. The fresh air or the fresh mixture which is driven by a blower can pass by way of the inlet ducts 40 into the combustion chamber 30, the fresh mixture or the fresh air flowing with a circling motion along the wall of the cylinder 10. In the second stroke the piston 20 is moving from the bottom dead center position to the top dead center position. In this case the exhaust duct 70 is closed both by the valve element 80 and also by the piston 20. Then the inlet ducts 40 are also closed by the valves 50 and the fresh mixture or the fresh air is compressed. Shortly before the piston reaches the top dead center position the fresh mixture is fired by means of the sparking plug 60 or, when the two-stroke internal combustion engine is operating as a Diesel-burning internal combustion engine, fuel is injected. It is to be noted that the exhaust duct 70 can be opened or closed independently of the position of the piston 20, by means of the controllable regulating element 80, that is to say, the exhaust duct 70 is already closed or opened before the piston 20 has assumed a corresponding position in the cylinder 10.

A so-called charge layering effect or layered charge can also be achieved with the two-stroke internal combustion engine according to the invention. In that case the feed of the fresh mixture occurs through the two injection valves 42a, 42b in the two inlet ducts 40. When the piston 20 moves from the top dead center position to the bottom dead center position, little fuel is added to the fresh air from the first injection valve 42a so that a lean mixture is produced. In the additional charging region, that is to say when the piston 20 is moving from the bottom dead center position to the top dead center position, a great deal of fuel is added to the incoming flow of air, by the second injection valve 42b, thus resulting in a rich mixture. By virtue of the piston 20 being of a particular configuration, the rich mixture collects in the combination chamber 24, which is of a part-spherical configuration, of the piston 20, where it is fired by the centrally arranged sparking plug.

Instead of two injection valves 42a, 42b in each respective inlet duct 40 or in the case of a single inlet duct 40, it is also possible to use a step injection valve. Likewise two injection valves can be provided in relation to a single inlet duct.

Finally it is also to be pointed out that the drive of the control elements or valves for the inlet and exhaust ducts can be adjusted electrohydraulically, whereby the control times can be adapted to the respective requirement involved.

FIG. 5 shows a working diagram for a five-cylinder two-stroke in-line engine. The engine has a selected firing order of cylinders 1, 4, 2, 5, and 3. In FIG. 5, the number 1 represents the compression stroke, 2 represents scavenging, 3 represents additional charging, and 4 represents compression. It can be directly seen from this working diagram that the internal combustion engine according to the invention not only has a high level of efficiency but it is also smooth in operation as the overlap of the individual working strokes is comparatively great.

I claim:

1. A two-stroke internal combustion engine including at least one cylinder (10) with a piston (20) reciprocating therein and first and second inlet ducts (40) and at least one exhaust duct (70), wherein the inlet ducts (40) are arranged in relation to the exhaust duct (70) in accordance with the uniflow scavenging process in such a way that the inlet ducts (40) open into the cylinder (10) in the region of the combustion chamber (30), wherein a regulating element (50) is arranged in the mouth opening region of the respective inlet ducts (40) and wherein each inlet duct (40) is provided with an injection valve (42a, 42b), characterized in that inlet ducts (40) open tangentially into the cylinder 10, that a regulating element (80) which is also controllable is arranged in the mouth opening region of the exhaust duct (70), wherein a mixture containing only little fuel passes into the combustion chamber (30) by means of the first injection valve (42a) arranged in the first inlet duct (40) and a rich mixture passes into the combustion chamber (30) by means of the second injection valve (42b) arranged in the second inlet duct (40).

2. A two-stroke internal combustion engine including at least one cylinder (10) with a piston (20) reciprocating therein and an inlet duct (40) and at least one exhaust duct (70), wherein the inlet duct (40) is arranged in relation to the exhaust duct (70) in accordance with the uniflow scavenging process in such a way that the inlet duct (40) opens into the cylinder (10) in the region of the combustion chamber (30), and wherein a regulating element (50) is arranged in the mouth opening region of the inlet duct (40), characterized in that there is provided a second inlet duct (40), that the two inlet ducts (40) open tangentially into the combustion chamber (30) of the cylinder (10) and are each provided with a respective controllable regulating element (50) with control dependent upon at least one operating parameter of the engine, that a regulating element (80) which is also controllable dependent on at least one operating parameter of the engine is arranged in the mouth opening region of the exhaust duct (70), and that an injection nozzle (60') for firing a Diesel fuel mixture is arranged on the longitudinal axis (L) of the cylinder (10) in the combustion chamber (30) of the cylinder (10), whereby the regulating elements (50, 80) are controlled in dependence on one or more operating parameters of the engine which allow asymmetrical control thereof.

3. A two-stroke internal combustion engine according to claim 1 characterized in that the inlet ducts (40) open in the cylinder head (12) into the combustion chamber (30).

4. A two-stroke internal combustion engine according to claim 1 characterized in that the two inlet ducts (40) are arranged symmetrically relative to the longitudinal axis (L) of the cylinder (10).

5. A two-stroke internal combustion engine according to claim 1 characterized in that the cylinder head (12) and the piston (20) each have an annular squish surface (14, 26).

6. A two-stroke internal combustion engine according to claim 1 characterized in that the piston (20) is provided with a mixture guide element (22) at its upper piston surface.

7. A two-stroke internal combustion engine according to claim 6 characterized in that the mixture guide element is a frustoconical raised portion (22).

8. A two-stroke internal combustion engine according to claim 6 characterized in that the mixture guide element (22) is provided in its center with a recess (24).

9. A two-stroke internal combustion engine according to claim 1, characterized in that a sparking plug (60) is arranged on the longitudinal axis (L) of the cylinder (10).

10. A method of operating a mixture-forming internal combustion engine, wherein at least one cylinder is provided with a piston reciprocating therein and with at least two inlet ducts each provided with an injection valve and with at least one exhaust duct, wherein the inlet ducts are arranged in a relation to the exhaust duct in accordance with the uniflow scavenging process in such a way that the inlet ducts open into the cylinder in the region of the combustion chamber, and wherein a respective regulating element is provided in the mouth opening region of each inlet duct, characterized in that the fresh mixture is introduced into the cylinder with a circling motion, that the exhaust duct is controlled in dependence on an operating parameter of the internal combustion engine, in particular the rotary angular position of the crankshaft, that when the piston moves from the top dead center position to the bottom dead center position a mixture containing only little fuel passes into the combustion chamber by means of the first injection valve arranged in the first inlet duct and that when the piston moves from the bottom dead center position to the top dead center position a rich mixture passes into the combustion chamber by means of a second injection valve arranged in a second inlet duct.

11. A two-stroke internal combustion engine according to claim 1, characterized in that the regulating element (80) which is also controllable is controllable dependent upon at least one operating parameter of the engine, whereby the regulating element (80) is controlled in dependency on one or more operating parameters of the engine which allows asymmetrical control thereof.

12. A method according to claim 10 characterized in that the lean mixture passes into the combustion chamber shortly before the piston reaches the bottom dead center position.

13. A method according to claim 10 characterized in that the mixture in the cylinder chamber is accelerated by means of the piston as it moves from the bottom dead center position to the top dead center position.

14. A method according to claim 10 characterized in that the mixture in the cylinder chamber is collected in the center of the combustion chamber by means of the piston as it moves from the bottom dead center position to the top dead center position.

15. A two-stroke internal combustion engine according to claim 2 characterized in that the inlet ducts (40) open in the cylinder head (12) into the combustion chamber (30).

16. A two-stroke internal combustion engine according to claim 2 characterized in that the two inlet ducts (40) are arranged symmetrically relative to the longitudinal axis (L) of the cylinder (10).

17. A two-stroke internal combustion engine according to claim 2 characterized in that the cylinder head (12) and the piston (20) each have an annular squish surface (14, 16).

18. A two-stroke internal combustion engine according to claim 2 characterized in that the piston (20) is provided with a mixture guide element (22) at its upper piston surface.

19. A two-stroke internal combustion engine according to claim 18 characterized in that the mixture guide element is a frustoconical raised portion (22).

20. A two-stroke internal combustion engine according to claim 18 characterized in that the mixture guide element (22) is provided in its center with a recess (24).

* * * * *